(12) United States Patent
Aoshima et al.

(10) Patent No.: US 7,188,136 B1
(45) Date of Patent: Mar. 6, 2007

(54) METHOD OF AND AN APPARATUS FOR DISTRIBUTING INFORMATION, A METHOD OF AND AN APPARATUS FOR RECEIVING INFORMATION, A SYSTEM FOR DISTRIBUTING INFORMATION, AND A PROGRAM PRODUCT FOR CONDUCTING INFORMATION DISTRIBUTION

(75) Inventors: Hirokazu Aoshima, Yokohama (JP); Tomohiro Murata, Yokohama (JP); Tsukasa Saitou, Tokyo (JP); Kazuya Uemura, Kashiwa (JP); Yoshio Endou, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/550,898

(22) Filed: Apr. 17, 2000

(30) Foreign Application Priority Data

Apr. 20, 1999 (JP) ............................... 11-111827

(51) Int. Cl.
*G06F 15/16* (2006.01)
(52) U.S. Cl. ...................................... 709/203; 709/225
(58) Field of Classification Search ................ 709/203, 709/229, 225; 713/200, 201, 180
See application file for complete search history.

(56) References Cited

U.S. PATENT DOCUMENTS

| | | | | |
|---|---|---|---|---|
| 5,708,780 A | * | 1/1998 | Levergood et al. | 709/229 |
| 5,796,952 A | | 8/1998 | Davis et al. | |
| 5,987,523 A | | 11/1999 | Hind et al. | |
| 6,052,730 A | * | 4/2000 | Felciano et al. | 709/225 |
| 6,125,384 A | * | 9/2000 | Brandt et al. | 709/203 |
| 6,253,288 B1 | * | 6/2001 | McAllister et al. | 711/137 |
| 6,314,565 B1 | * | 11/2001 | Kenner et al. | 717/171 |
| 6,442,687 B1 | * | 8/2002 | Savage | 713/156 |
| 6,754,826 B1 | * | 6/2004 | Challener et al. | 713/182 |
| 2002/0103884 A1 | * | 8/2002 | Duursma et al. | 709/219 |

FOREIGN PATENT DOCUMENTS

| | | |
|---|---|---|
| EP | 96/42041 | 12/1996 |
| JP | 11045228 | 2/1999 |

OTHER PUBLICATIONS

TCP/IP Illustrated, vol. 3, W.R. Stevens, "Hypertext Transfer Protocol", pp. 161-176.
"Java in a Nutshell", Second Edition, May 1997, David Flanagan, pp. 9-13.
"HTML for Fun and Profit", Mary E. S. Morris, pp. 66-71.
Core Java, Second Edition, Gary Cornell et al, The Sunsoft Press, Apr. 1997, pp. 46-49.
Java Quick Reference, David Flanagan, Japan Sunmicro Systems, Sep. 1996, pp. 14-20.
Illustrated Guide to HTTP, Paul Hethmon, Manning Publications Co., Jun. 1998, pp. 8-25 and 38-41.

\* cited by examiner

*Primary Examiner*—Ario Etienne
*Assistant Examiner*—Barbara Burgess
(74) *Attorney, Agent, or Firm*—Mattingly, Stanger, Malur & Brundidge, P.C.

(57) ABSTRACT

In an information distributing method, an information providing resource receives from an information user unit a request statement including a code to identify first information and information (URI) to identify second information quoted in the first information. According to the identifying information of the second information included in the request statement, the information providing resource determines whether or not transmission of the second information to an information providing unit is allowed. The information providing side can control the operation in which the second information thereof is quoted to be opened in the first information.

39 Claims, 8 Drawing Sheets

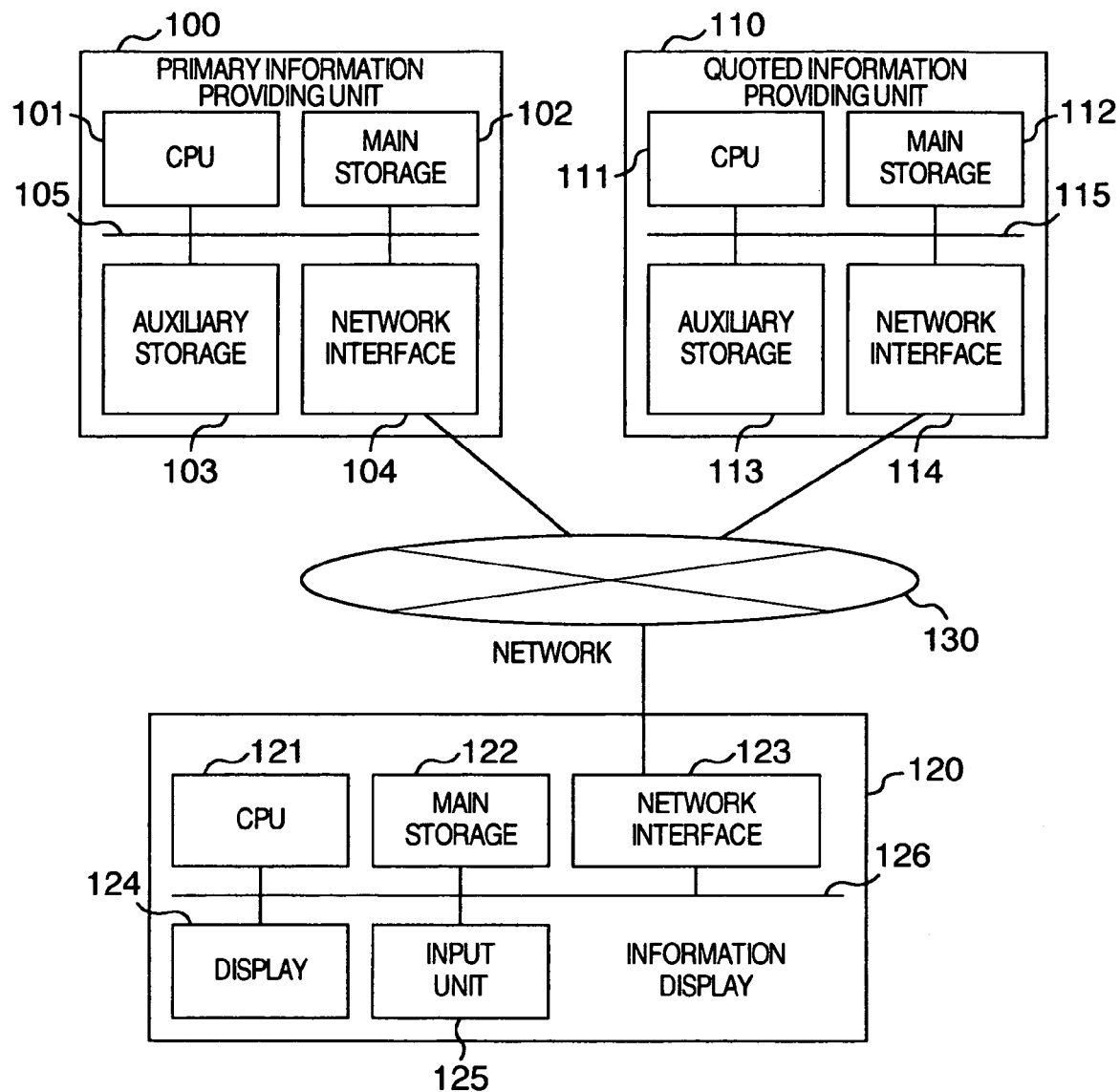

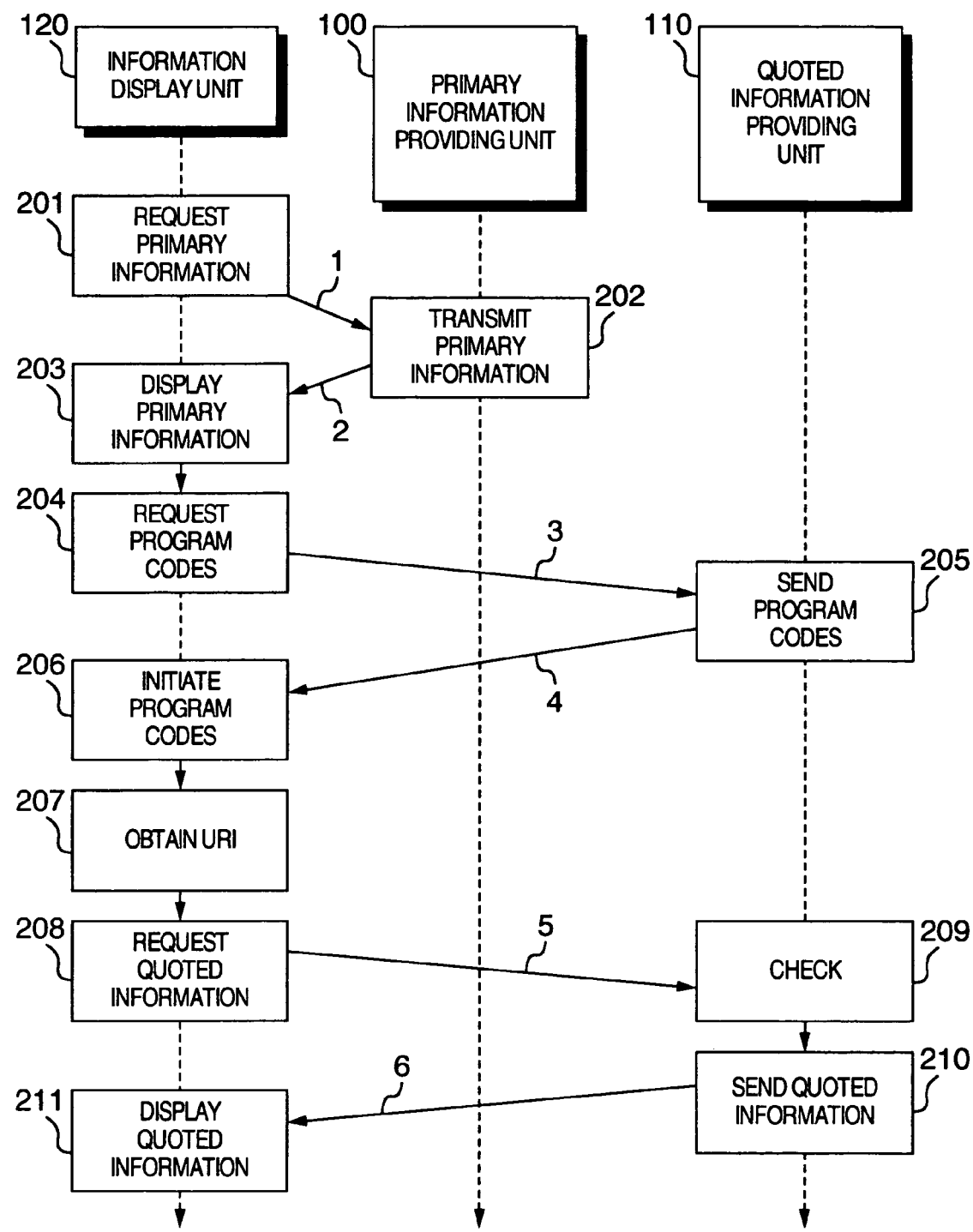

⟨APPLET CODE="HTTP://machineB/pict.class" width="100" height="100"⟩
⟨PARAM name="ID" value="pict1"⟩
⟨PARAM name="CGI" value="HTTP://machineB/pict.cgi"⟩
⟨/APPLET⟩ http://machineB/pict.cgi?passwd=12345678&URI="HTTP://machineA/index.html"&ID=pict1

FIG. 7
| ID | URI ALLOWED FOR QUOTATION |
|---|---|
| pict1 | HTTP://machineA/index.html |
| pict2 | HTTP://machineA/default.html |
| pict2 | HTTP://machineB/Title.html |
| . . . . | . . . . |
QUOTATION ALLOWANCE DATABASE
FIG. 8
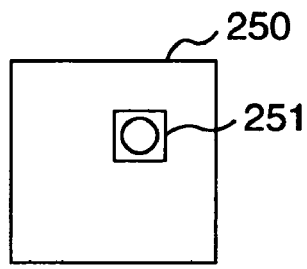
FIG. 9
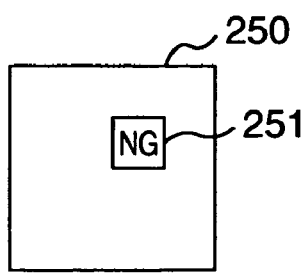

FIG. 10
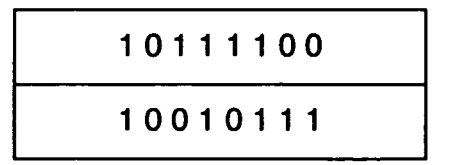
ENCRYPTION KEY DATABASE
FIG. 11
http://machineB/pict.cgi?URI="HTTP://machineA/index.html"&ID=pict1
FIG. 12
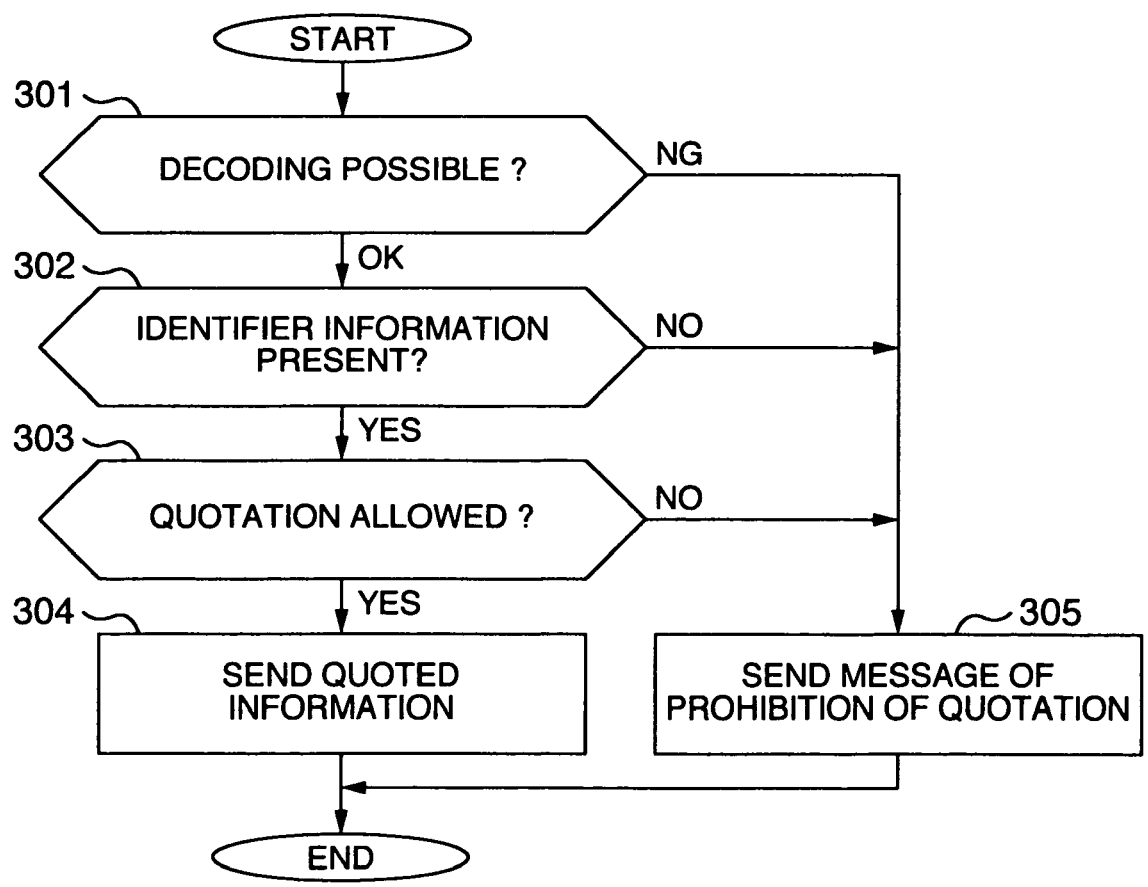

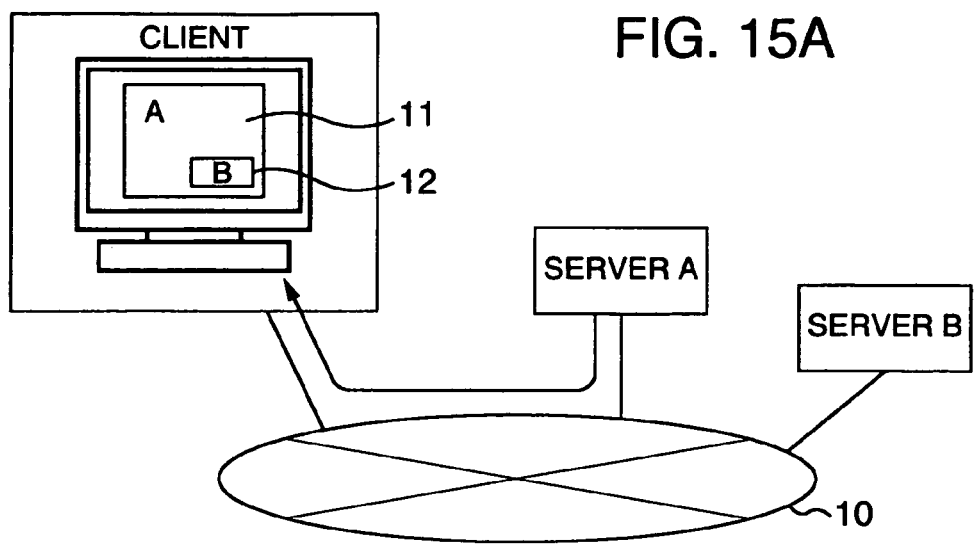
FIG. 15A
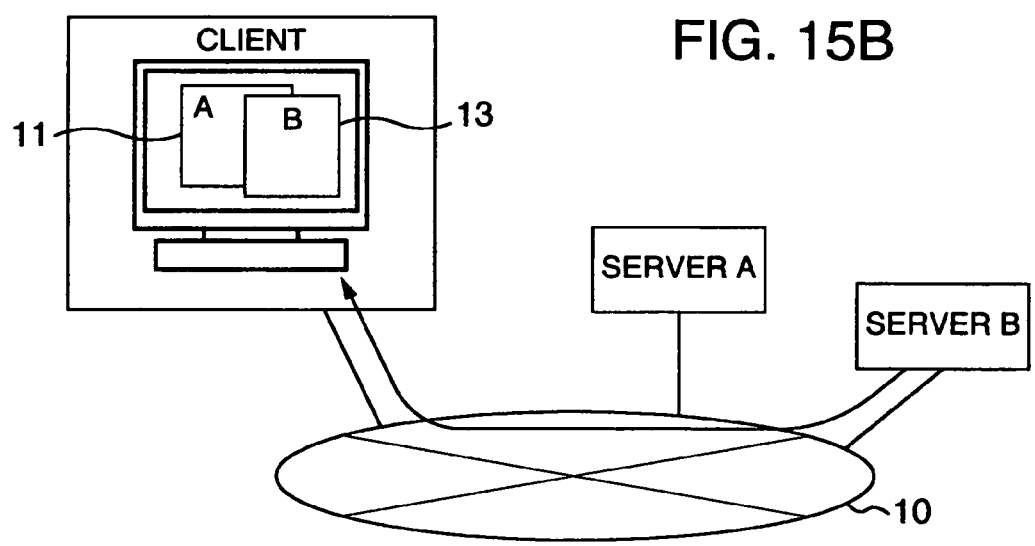
FIG. 15B
FIG. 15C
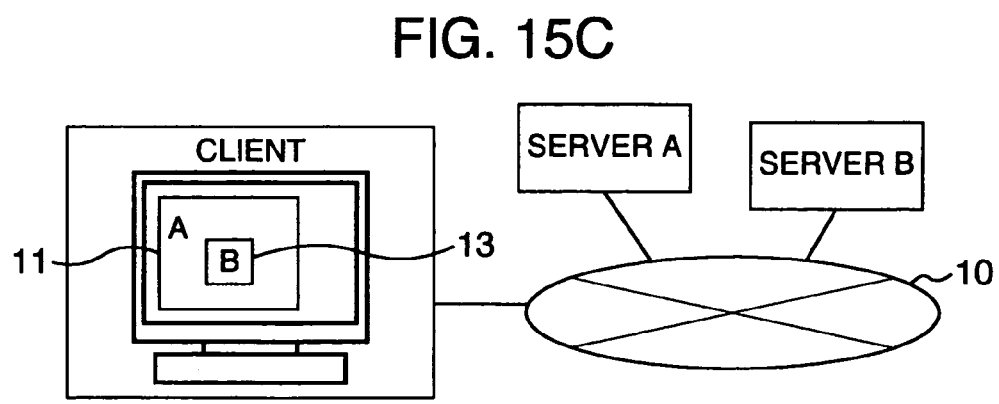

METHOD OF AND AN APPARATUS FOR DISTRIBUTING INFORMATION, A METHOD OF AND AN APPARATUS FOR RECEIVING INFORMATION, A SYSTEM FOR DISTRIBUTING INFORMATION, AND A PROGRAM PRODUCT FOR CONDUCTING INFORMATION DISTRIBUTION

BACKGROUND OF THE INVENTION

The present invention relates to an information distribution system in which information mutually related as hypertexts to each other is distributed via a network.

The present invention particularly relates to a method of and an apparatus for distributing information, a method of and an apparatus for receiving information, a system for distributing information, and a program product for conducting information distribution in which when first information in an information providing unit is quoted by a second information, transmission of the first information from the information providing unit can be automatically limited or controlled.

Recently, the World Wide Web (WWW) has been increasingly employed as a system to provide information via the Internet. In many cases, information used by the WWW is hypertext described in the hypertext markup language (HTML). It is possible in the HTML to describe quotation of and reference to information by a notation called uniform resource identifier (URI). The URI is described, for example, in "HTTP: Hypertext Transfer Protocol" Chapter 13, pages 161 to 176 of "TCP/IP Illustrated, Volume 3 written by W. Richard Stevens and published from Addison-Wesley Publishing Company. According to description of this literature, the URI is used to identify a particular resource available via the hypertext transfer protocol (HTTP). The HTTP is a representative protocol used in the WWW and its outline is described in the literature above. In short, this is a protocol to transmit information in which an information requesting unit sends a request to an information providing unit, and the providing unit sends in response to the request a response to the requesting unit.

The WWW provides information using an information providing unit connected to a network called Web server.

Software called Web browser is ordinarily used to request and to display information. The Web browser is software which requests information from the Web server to display the information. The Web browser can acquire, according to description of hypertext described in the HTML, information from a Web server connected to a network to display the information. In many cases, the Web browser can display multimedia information including images and sounds.

The Web browser has ability in many cases to attain program codes called Java applet via a network and to execute the Java applet. The Java applet is described, for example, in pages 9 to 13 of "Java in a Nutshell, Second Edition" written by David Flanagan and published from O'Reilly & Associates, Inc. in May 1997.

Information can be quoted and referred to by the HTML description without paying attention to which one of the servers provides the information. This consequently promotes development of relationships between information to be provided and effective uses of the information. On the other hand, there arise problems, for example, the information quoted is used apart from a purpose of a person who has originally provided the information and/or an operation to refer to the information is against interests of the person.

SUMMARY OF THE INVENTION

Description will be given of an example of such a disadvantageous quotation of information. FIG. 15 schematically shows a screen image including a quote or an icon 12 in a homepage 11 provided by a server A as an information providing unit. Icon 12 is used to access, via a communication network 10 such as the Internet, a site of a homepage or information contents (images, characters, sounds) provided by another server B to open information thereof. When the quote or icon 12 is clicked in the screen, a homepage 13 provided by server B is displayed to overlap with homepage 11 of server A or information contents are displayed therein as shown in FIG. 15B. FIG. 15C shows a screen image in which a homepage of server B or information contents is or are embedded in homepage 11 of server A. The operation above is as follows. In a Web page which is described in the HTML and which is open on a display of computer as a user of information on a client side, another Web page is quoted. The Web page or information contents quoted is or are acquired from a server storing the Web page or information contents and is or are loaded in the computer on the client side. Such an example of quotation of information and display of information quoted are described, for example, in pages 66 to 71 of "HTML for Fun and Profit" written by Mary E. S. Morris and published from SunSoft Press.

It is preferable that a supplier of the Web page who quotes a Web page (serve A side) beforehand obtains approval or allowance of a supplier of the Web page to be quoted (server B side). Thereafter, the supplier on the server A side operates to display quote or icon 12 in his or her Web page and quotes the target Web page to thereby establish a link between these Web pages. However, by a feature of the HTML, it would be possible to freely quote an external Web page to open the page without acquiring approval of the other party. There possibly arise troublesome situations, for example, the contents of Web page 13 quoted conflict with those of Web page 11 quoting Web page 13, interests respectively of Web pages 13 and 12 are related to each other, or the operation to quote Web page 13 is against interests of the supplier of Web page 13. These situations may also occur between mutually different Web pages supplied by one server. That is, it often occurs that Web pages of different information suppliers exist in one server and the different Web pages quote each other. In these situation, for a request of transmission of the contents of the Web page quoted in a Web page of another person, it is desirable that the supplier of the Web page quoted has control over the request. Even for different Web pages supplied from one information supplier, there may exist a case in which it is allowed or not allowed that one of the pages quotes the other one page to open the page. It is favorable for the information providing side to have control when necessary over the operation in which the contents of his or her Web page is quoted to be opened in a Web page of the other party.

For easy understanding of description, information of homepage image 11 provided by server A and information of homepage 13 of server B respectively shown in FIGS. 15A and 15B are referred to respectively as primary information and quoted information in this application. A side to provide primary information such as server A is called first information providing resource and a side to supply quoted information such as server B is called second information providing resource. In this regard, "information providing resource" indicates an entire server computer, a storage under control of the server computer, or a file in the storage depending on cases. First information, namely, primary information and second information, i.e., quoted information may be stored in different servers or in one server. In the description of embodiments below, "information display" indicates a unit to use information which receives information distributed from a server to display the information. In FIG. 15A, this indicates an overall client computer or only a display section thereof. In the present invention, the first and second information may include a still picture, a moving picture, a text, and sound information.

It is therefore an object of the present invention to provide a method of and an apparatus for restricting an operation to open second information in first information other than the second information through quotation of the second information and thereby increasing security of the information.

Another object of the present invention is to provide a method of and an apparatus for allowing, when first information received by an information user unit quotes second information other than the first information, the second information can be transmitted to the information user unit only when a predetermined condition is satisfied.

In accordance with the present invention, an information providing resource receives a request statement which is sent from an information user unit and which includes a code to identify first information and information to identify second information quoted in the first information. According to the information identifying the second information, the resource determines allowance or prevention of transmission of the second information to the unit. That is, the resource side can control the operation in which the second information of the resource side is quoted to be opened in the first information.

In accordance with the present invention, the opening of the second information in the first information can be conducted only with approval of the information providing resource side. The information supplying person, i.e., the information providing resource can arbitrarily specify first information of another information providing resource which can be quoted to be opened by quoting second information of the information supplying party. Only the first information above can be quoted to be opened by quoting the second information.

In a method of and an apparatus for distributing information to distribute information via a network to an information user unit, whether or not information quoted is sent to the information user unit is determined in a procedure as follows. The second information providing resource receives a first request from an information user unit receiving the first information from the first information providing resource. In response to the first request, the second information providing resource sends a predetermined program code to the information user unit. The information user unit generates according to the program code a second request to receive the second information quoted in the first information from the second information providing resource and then sends the second request to the second information providing resource. In response to the second request received, the second information providing resource determines allowance or rejection of the second request according to at least identifying information contained in the second information.

In accordance with the present invention, a method for an information user unit to receive information via a network from an information providing unit is achieved as follows. The information user unit receives first information from a first information providing resource and then requests a program code from a second information providing resources. On receiving the program code therefrom, the information user unit generates a second request to receive second information quoted in the first information from the second information providing resource and sends the second request to the second from the second information providing resource. The information user unit then receives from the second information providing resource the second information for which the second information providing resource has allowed quotation according to the second request.

In accordance with the present invention, there is provided a computer program product comprising a computer usable medium having computer readable program code means embodied therein for distributing information via a communication path to an information user unit. The computer readable program code means comprises means for receiving a first request from the information user unit receiving first information from a first information providing resource, means for transmitting a predetermined program code to the information user unit, means for receiving a second request to receive second information quoted in the first information from second information providing resource, and means for determining in response to the second request whether or not the second request is allowed according to identifying information included at least in the second request.

BRIEF DESCRIPTION OF THE DRAWINGS

The objects and features of the present invention will become more apparent from the consideration of the following detailed description taken in conjunction with the accompanying drawings in which:

FIG. 1 is a diagram showing an overall configuration of a first embodiment of an information distribution system in accordance with the present invention;

FIG. 2 is a diagram for explaining a password database;

FIG. 3 is a flow diagram for explaining operation of the first embodiment;

FIG. 7 is a diagram to explain a quotation allowance information database;

FIG. 8 is a display example in which quoted information is displayed in an image of contents allowed for quotation;

FIG. 9 is a display example in which information to be quoted cannot be displayed in an image of contents not allowed for quotation;

FIG. 10 is a diagram for explaining an encryption key database;

FIG. 11 is a diagram showing a message example which is used to acquire quoted information and which is to be encrypted using cryptography;

FIG. 12 is a flowchart showing processing of a CGI to provide quoted information by a message encrypted;

FIGS. 15A and 15B are diagrams for explaining operation in which on a Web page displayed on a screen, other information contents are displayed by quotation;

FIG. 15C is a diagram for explaining an operation in which in a Web page displayed on a screen, contents of a Web page of another server is embedded.

DESCRIPTION OF THE EMBODIMENTS

Figures 4, 5, 6:
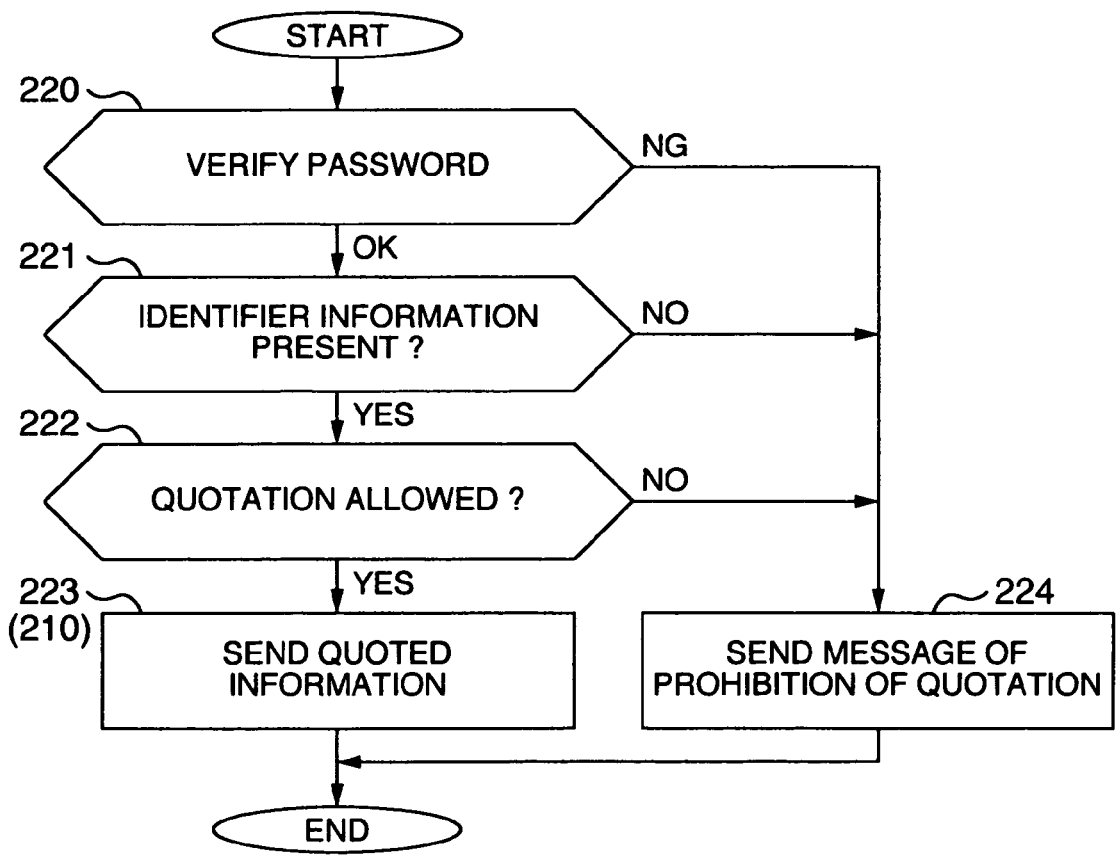
FIG. 4 is a diagram showing an example of a tag to quote quoted information.
FIG. 5 is a diagram showing an example of a message to acquire quoted information using a password.
FIG. 6 is flowchart showing processing of a CGI to provide quoted information by a message using a password.

Referring next to drawings, description will be given of embodiments of the present invention. The present invention is not restricted by embodiments described below.

The First Embodiment

FIG. 1 shows in a block diagram a general configuration of a first embodiment of an information distribution system in accordance with the present invention. This system at least includes a primary information providing unit 100, a quoted information providing unit 110, an information display unit 120, and a network 130 to connect these constituent components to each other. Units 100 and 110 are servers and display unit 120 is a client. Unit 100 and 110 respectively include central processing units 101 and 111, main storages 102 and 112, auxiliary storages 103 and 113, communication network interfaces 104 and 114, and buses 105 and 115 for connections of these units. It is assumed in the following description of this embodiment that second information provided by unit 110 is quoted in first information provided by unit 100 and the information quoted is displayed on display 124.

Figure 13:
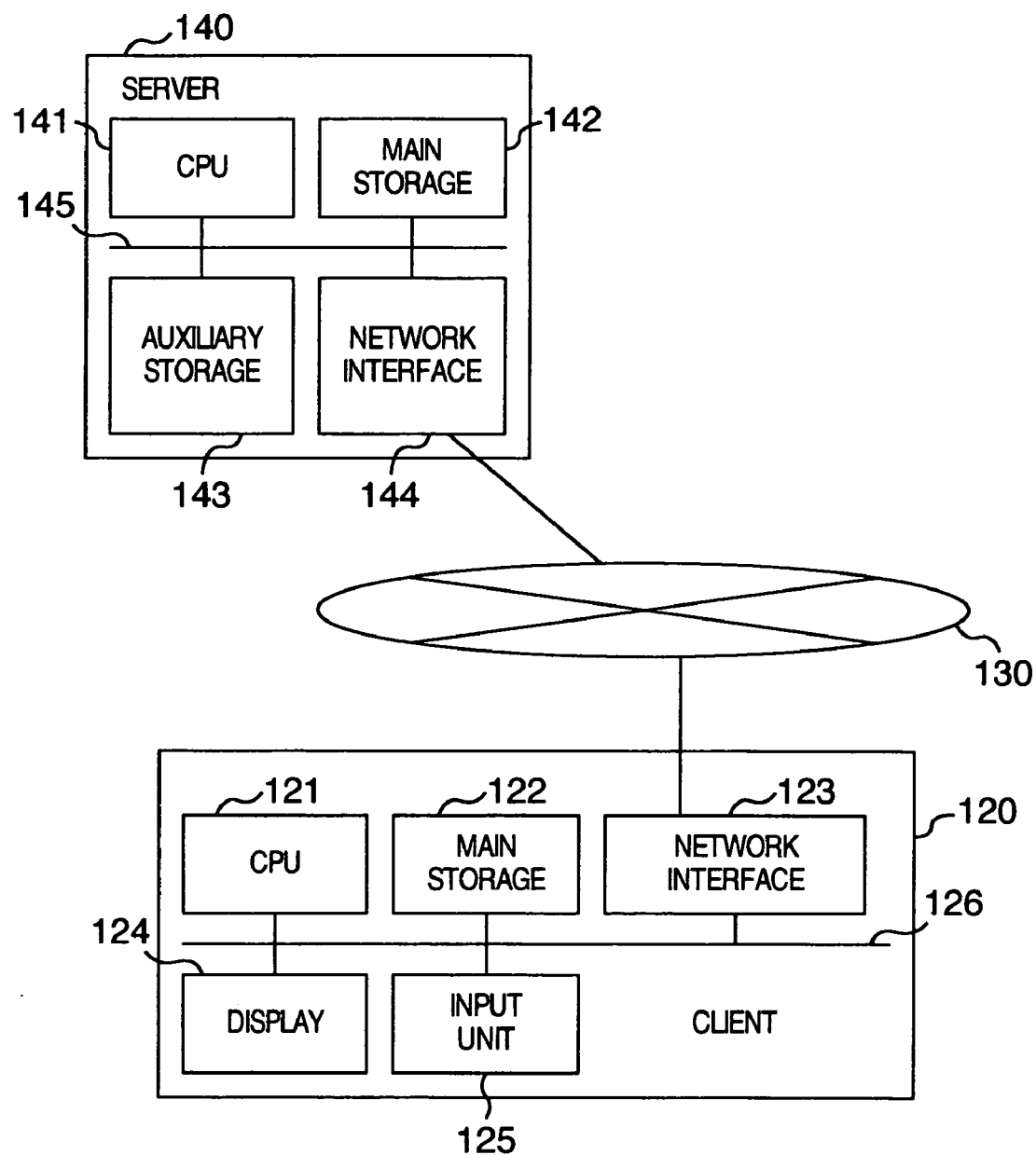
FIG. 13 is a block diagram showing a system in which operations of the primary and quoted information providing units are achieved by one server unit.
Figure 14:
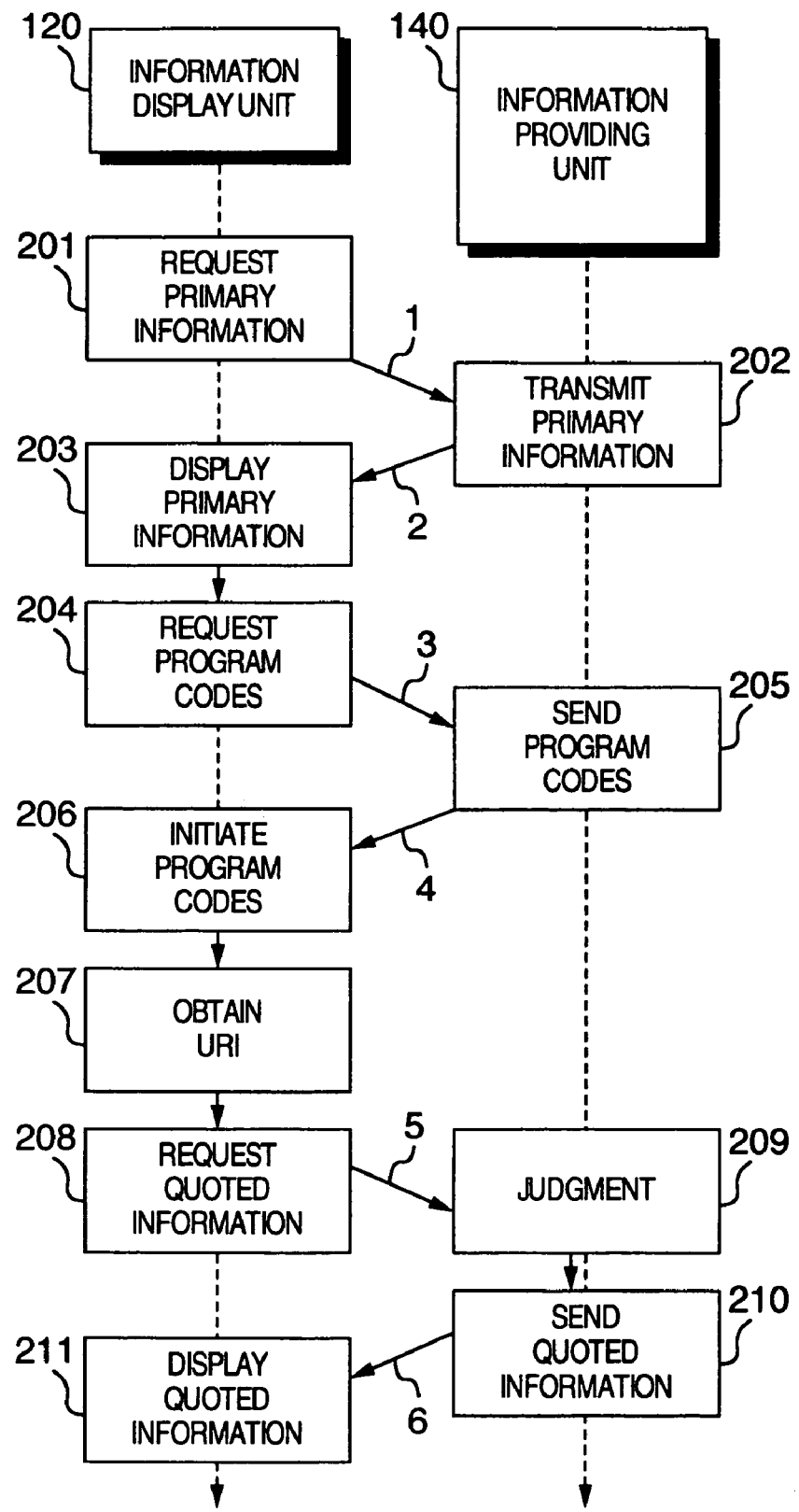
FIG. 14 is a flowchart showing information distribution processing of the system of FIG. 13.

The present invention is also applicable to a system configuration shown in FIG. 13 in which units 100 and 110 are implemented in one server 140 and display unit 120 serves as a client. FIG. 14 shows processing of the system of FIG. 13 in a flowchart. The system configuration and the processing are basically similar to FIGS. 1 and 3. Consequently, reference is to be made to description of FIGS. 1 and 3.

Display unit 120 includes a CPU 121, a main storage 122, a communication network interface 123, a display 124, an input unit 125, and a bus 126 to connect these components to each other. Main storage 122 is loaded with a Web browser program, and results of operation of the program are displayed on display 124. Although the embodiment is configured on assumption that display unit 120 is a general personal computer, another configuration is also possible. For example, there may be used a personal digital assistant or a device implemented by adding an information display function to a television set. Moreover, display unit 120 is not limited to an image displaying apparatus which uses the sense of sight, but may be a device which outputs various multimedia information in a form which can be used by the user. Namely, display unit 120 may include a device which utilizes the sense of touch and/or the sense of hearing.

The Web browser to operate in display 120 has a function which acquires a Java applet via network 130 from an external device to operate the applet. Although a set of the program codes acquired by display unit 120 via network 130 for operation thereof is a Java applet in this embodiment, there may be used program codes of another language specification. In this embodiment, the Java applet is obtained from quoted information providing unit 110.

Primary information providing unit 100 operates according to a Web server program loaded from auxiliary storage 103 in main storage 102. On receiving via network 130 an information request in the HTTP from display unit 120, unit 100 provides hypertext information from auxiliary storage 103 to display unit 120. The hypertext information includes contents such as a text, a still picture, a moving picture, and sound and is, for example, a Web page.

In quoted information providing unit 110, a password update program and a Web server program are loaded in main storage 112 and are executed. These programs operate in a multiprocessing manner.

The password update program updates, at a sufficiently short interval of time, a password of a Java applet provided by quoted information providing unit 110 and updates a password database (FIG. 2) stored in auxiliary storage 113. The sufficiently short interval of time above indicates an interval of time which is as short as possible to make it difficult that a third party analyzes the Java applet to obtain a password and uses the password for an illegal information request. In this example, the update is conducted, for example, at an interval of one minute. When a Java applet is requested to Web server 110 from client 120 using a predetermined URI, the Java applet is provided to client 120 as the information requesting source.

The password database (FIG. 2) is a database in auxiliary storage 113 to store a certain number of latest passwords, i.e., late passwords. In this embodiment, two passwords including a previous password and a current password are stored. When a password is updated, the oldest one of the passwords stored in the database is deleted and the new password is stored. Although the password includes an 8-digit numeric character string in this embodiment, there may be used another character string.

The Web server program operating in quoted information providing unit 110 is called common gateway interface (CGI) The CGI provides a mechanism in which in response to a request from display unit 120, a program to operate in unit 110 is called via a network from auxiliary storage 113 and then results of execution of the program are passed via a network to display unit 120. The CGI is a function included in many Web browser programs. The CGI can be called through communication with the Web server using a predetermined URI. The scheme of CGI can implement ways and means to provide the quoted information. Details of the ways and means will be described later. Although the Web server program is implemented by the CGI in this embodiment, another configuration may also be used.

First, an outline of overall processing will be described and then description will be given of processing of program codes operating in display unit 120 and processing executed by the CGI in quoted information providing unit 110.

Description will now be given of an outline of overall processing by referring to FIG. 3. Display 120 issues a request with the specification of URI 1 to primary information providing unit 110 for desired hyper text information (step 201). In this description, the URI 1 is assumed to be "HTTP://machineA/index.html". Hypertext information 2 request to unit 100 by URI 1 includes a description to quote information, e.g., an image to be provided by unit 110. FIG. 15A shows an example of a display image in this operation. As an example of the description of hypertext information 2, a tag description shown in FIG. 4 is assumed to be included. In this example, character strings following "CODE=" are a URI to specify a program code to be provided by quoted information providing unit 110, and character strings enclosed by "<PARAM" and ">" indicate parameters to be passed to a Java applet. This example indicates that a character string "pict1" is passed as a value of parameter "ID" and a character string "HTTP://machineB/pict.cgi" is passed as a value of a parameter "CGI". These parameters respectively indicate an identifier to specify information to be quoted from quoted information providing unit 110 and a character string to indicate details of a quoted information request destination for unit 110. The notation and the contents thereof are adjusted according to changes in the HTML specification and in the embodying mode.

On receiving the hypertext information (FIG. 4) from unit 100 (step 202), display unit 120 displays a Web page on display 124 according to description of information received (step 203) and issues a request to unit 110 for another image quoted. First, display unit 120 issues a request 3 of program codes (step 204). Unit 110 sends a program code (Java applet) 4 to display unit 120. Display unit 120 then activates the program codes received (step 206). The program codes then acquires an URI of the primary information (step 207) and issues an information request 5 with a password included in the program codes to the CGI of unit 110 (step 208). Unit 110 receives a request 5 for quoted information and then sends image information 6 allowed for quotation by judge processing (step 209), which will be described later (step 210). Display unit 120 displays quoted information thus received (step 211).

Next, description will be given in detail of processing of program codes which corresponds to steps 206, 207, 208, and 211 and which is initiated in display unit 120. When initiated in step 206, the program code conducts processing of initialization and then acquires an URI of the primary information in step 207. Thereafter, the program code generates a quoted information request message 5 using an URI of a CGI of unit 110 in the program codes, a password similarly embedded in the program codes, an URI of the primary information, and an identifier of quoted information specified by a parameter. Conforming to a grammatical definition of the URI, a parameter for the CGI is described following the URI of CGI and "?" in message 5. For the parameter of the CGI, a value is described after "=" following a parameter name. To describe a plurality of parameters, "&" is used as a separation character. Therefore, when the URI of CGI is http://machineB/pict.cgi and the password is "12345678", the message is as shown in FIG. 5. The program code sends this message to the CGI of unit 110. Display unit 120 displays quoted information 6 received from unit 110.

Referring next to FIG. 6, description will be given in detail of processing of the CGI of unit 110 in steps 209 and 210 associated with FIGS. 3 and 4. On receiving request 5 of quoted information (FIG. 5), the CGI program of unit 110 first verifies a password (step 220). The verification is carried out by checking whether or not a password stored in the password database matches the password contained in the request message. Next, the program checks to determine whether or not an identifier of requested information exists (step 221). In this embodiment, a check is made to determine whether or not the quoted information specified by the identifier exists as a file at a predetermined position of auxiliary storage 113. Next, the program determines whether or not the primary information is allowed for quotation (step 222). This is conducted by checking a quotation allowance database (FIG. 7) storing a pair of the identifier of the quoted information and an URI of primary information allowed for quotation. If the checks are successfully passed up to this point, the program sends the quoted information to display 120 having issued the request (223). Otherwise, the program sends information indicating that the quotation is not allowed for the quoted information to the request source unit (224).

For example, when the quoted information requested is an image of a circle 251 and is allowed for quotation, quoted information 251 is displayed in primary information 250 in the Web browser screen of display 124. When the quotation is not allowed, a response signal indicating "NG" or "UNAVAILABLE" is transmitted, and then warning information 251 is displayed in primary information 250 as shown in FIG. 9.

The Second Embodiment

Since the second embodiment is equal in the basic embodying mode to the first embodiment above, description will be given of different sections therebetween. The second embodiment has a general configuration substantially equal to that shown in FIG. 1. In this embodiment, a primary information providing unit and an information display are the same as those of the first embodiment.

Quoted information providing unit 110 operates according to an encryption key update program and a Web server program which are loaded in main storage 112. It is assumed that these programs operate in a multiprocessing manner.

The encryption key update program updates, at a sufficiently short interval of time, an encryption key of a Java applet (program codes) provided by unit 110 and updates an encryption key database (FIG. 10) stored in auxiliary storage 113. The sufficiently short interval of time above indicates an interval of time which is as short as enough to make it difficult that a third person analyzes the Java applet to obtain an encryption key and uses the key for an illegal information request. It is assumed in this embodiment that the update is conducted at an interval of one minute. When requested to the Web server using a predetermined URI, the Java applet is provided to the information requesting unit.

The encryption key database (FIG. 10) is a database to store a certain number of latest encryption keys. In this embodiment, two encryption keys including a current encryption key and a previous key are stored. When an encryption key is updated, the oldest one of the encryption keys stored in the encryption key database is deleted and the new encryption key is stored. Although the encryption key includes an 8-bit binary number in this embodiment, the key may be configured in another structure.

Overall processing of the second embodiment is fundamentally similar to that of the first embodiment. Differences are processing of a program code which operates in display unit 120 and processing of the CGI in unit 110.

The program code which operates in display unit 120 conducts, in place of the information request using a password, an operation to encrypt a message 3 of an information request using an encryption key. The CGI in unit 110 accomplishes, in place of the confirmation of the password, an operation to confirm whether or not the message encrypted can be decoded by an encryption key stored. Each processing will be described in detail.

Subsequently, description will be given in detail of processing of program codes which corresponds to steps 206, 207, 208, and 211 of FIG. 3 and which is activated by display unit 120 in the second embodiment. When activated in step 206, the program codes conduct processing of initialization and then acquires an URI of the primary information in step 207. Next, the program codes produces a quoted information request message 5 using an URI of a CGI of unit 110 in the program codes, an URI of the primary information, and an identifier of quoted information specified by a parameter. Conforming to a grammatical definition of the URI, a parameter for the CGI is described following the URI of CGI and "?" in message 5. For the parameter of the CGI, a value is described after "=" following a parameter name. To describe a plurality of parameters, "&" is used as a separation character. Therefore, when the URI of CGI is http://machineB/pict.cgi, the message is as shown in FIG. 11. The program codes then encrypts a last portion of the message beginning at a letter "?" using the encryption key. It is assumed in this description that the encryption processing is an exclusive logical addition between each character and the encryption key. It is also possible to employ another encryption method. The program code sends message 5 to the CGI of unit 110 and then displays quoted information 6 acquired as a result on display unit 120.

Next, referring to FIG. 12, description will be given in detail of processing in steps 209 and 210 of the CGI in unit 110. On receiving a quoted information request 5, the CGI program first encodes request 5 (FIG. 11). A check is made in the encoding operation to determine whether or not an encrypted portion included in the request message can be encoded by an encryption key stored in the encryption key database of auxiliary storage 113 (step 301). The program then checks to determine whether or not a file of an identifier of the quoted information thus requested exists in storage 113 (step 302). Next, the program checks to determine whether or not the primary information is allowed to be quoted (step 303). This is conducted by checking a quotation allowance database (FIG. 7) for a pair of the identifier of the quoted information and an URI of primary information allowed for quotation. If the checks are successfully carried out up to this point, the program sends the quoted information to display unit 120 (step 304). Otherwise, the program sends information indicating that the quotation is not allowed for the quoted information to display unit 120 (step 305). Results displayed on display 124 is the same as for the first embodiment.

It is also possible that programs to execute the procedures of the present invention shown in FIGS. 3, 6, 12, and 14 are stored on a computer-readable recording media such as a hard disk, a flexible disk, an optical disk, a magnetooptical disk, and semiconductor disk such that the programs are read therefrom, at execution thereof, to be respectively loaded in main storages 102, 112, 122, and 142 respectively of units 100, 110, 120, and 140 shown in FIG. 1 and are executed therein. These programs may be downloaded from an external device via network 130 into main storages 102, 112, 122, and 142 respectively of units 100, 110, 120, and 140

In accordance with the present invention, the quoted information is not directly quoted, namely, an authenticating function can be introduced by using a program code as an intervention item. It is also possible that the program code acquires an identifier of hypertext of the primary and passes the identifier to quoted information providing units 110 and 140.

Using the identifier of a hypertext of the primary information, units 110 and 140 can determine information to be provided. When a password is employed in an information request to quoted information providing units 110 and 140, it becomes difficult that an information request is issued to the quoted information providing units without using a program code as an intervention item.

The password is changed as occasion demands and hence an illegal information request becomes difficult as in a situation in which the information request is issued via the program codes. When an encryption unit is utilized for the information request to the quoted information providing unit, it becomes more difficult to issue an information request to the quoted information providing unit without using a program codes as an intervention item. The encryption unit is altered when necessary and hence an illegal information request is much more difficult as in a situation in which the information request is issued via program codes.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. An information distributing method of distributing information via a communication path to an information user unit from a first information providing resource unit and a second information providing resource unit, in said second information providing resource unit, said method, comprising the steps of:

receiving a program request from the information user unit which has received and displayed first information from said first information providing resource unit;

transmitting a predetermined program code to the information user unit according to the program request;

receiving a second request from said information user unit, said information request including an identifier of the first information and requesting said second information providing resource unit to transmit second information to said information user unit for displaying said second information linking to said first information, said second request being transmitted from said information user unit based on an execution of the program code in said information user unit;

determining, in response to the information request, whether or not the second information is allowed to be displayed as being linked to said first information by checking a database indicating a correspondence between an identifier code of the second information and the identifier of the first information which is allowed to link to said second information; and if said database indicates that said second information requested by said information user unit is allowed to be linked to said first information displayed in said information user unit, transmitting said second information to said information user unit.

2. An information distributing method according to claim 1, wherein:

the program code has a password;

the second request includes an identifier code to identify the second information to be quoted and the password; and the determining step further includes a step of collating the password in the second request received from the information user unit with a valid password.

3. An information distributing method according to claim 2, wherein the determining step allows the second request when the password in the second request is a valid password and the identifier code to identify the second information is included in the database.

4. An information distributing method according to claim 3, further including a step of frequently changing a password in a program code to be sent to the information user unit.

5. An information distributing method according to claim 1, wherein:

the program code includes an encryption key to encrypt the second request;

the second request includes information obtained by encrypting an identifier code to identify the second information according to the encryption key; and the determining step further includes a step of verifying to determine whether or not the second request can be decoded.

6. An information distributing method according to claim 5, wherein the determining step allows the second request when the second request can be decoded and the identifier code to identify the second information is included in the database.

7. An information distributing method according to claim 6, further including a step of frequently changing an encryption key in a program code to be sent to the information user unit.

8. An information distributing method according to claim 1, wherein when the first information providing resource is a first server and the second information providing resource is a second server,
   the first server distributes the first information via the communication path to a client as the information user unit and
   the second server distributes, if the determining step allows the second request, the second information quoted in the first information to the client.

9. An information distributing method according to claim 8, wherein the second server conducts the transmission of the program code and the determining step of allowance of the second request by a Web server program.

10. An information distributing method according to claim 1, wherein when the first information providing resource and the second information providing resource are implemented by a common server,
   said server distributes the first information via the communication path to a client as the information user unit and distributes, if the determining step allows the second request, the second information quoted in the first information to the client.

11. An information distributing method according to claim 1, wherein said information indicating the correspondence between an identifier code (ID) specifying the second information and said identifier of said first information is stored in a database.

12. An information distributing apparatus for distributing information via a communication path to an information user unit, comprising:
   means for sending a predetermined program code to the information user unit according to a first request from the information user unit which has received and displayed first information from a first information providing resource and
   means for determining, in response to a second request received from said information user unit, said second request requesting a second information providing resource to transmit second information quoted in the first information according to the program code, whether or not the second request is allowed according to identifying information (URI) at least included in the second request and information including a correspondence between an identifier code (ID) specifying second information for which quotation is allowed in the second information providing resource and an identifier of first information in the first information providing source, said identifying information (URI) identifying said first information,
   wherein if said second request is allowed, said second information is displayed at said information user unit as being linked to said first information.

13. An information distributing apparatus according to claim 12, wherein:
   the program code has a password;
   the second request includes an identifier code to identify the second information to be quoted and the password; and
   the determining means further includes means for collating the password in the second request received from the information user unit with a valid password.

14. An information distributing apparatus according to claim 13, wherein the determining means allows the second request when the password in the second request is a valid password and the identifier code to identify the second information is included in the database.

15. An information distributing apparatus according to claim 14, further including means for frequently changing a password in a program code to be sent to the information user unit.

16. An information distributing apparatus according to claim 15, further including a database for storing therein certain number of previous passwords and a current password.

17. An information distributing apparatus according to claim 12, wherein:
   the program code includes an encryption key to encrypt the second request;
   the second request includes information obtained by encrypting an identifier code to identify the second information according to the encryption key; and
   the determining means further includes means for verifying to determine whether or not the second request can be decoded.

18. An information distributing apparatus according to claim 17, wherein the determining means allows the second request when the second request can be decoded and the identifier code to identify the second information is included in the database.

19. An information distributing apparatus according to claim 18, further including means for frequently changing an encryption key in a program code to be sent to the information user unit.

20. An information distributing apparatus according to claim 19, further including a database for storing therein a certain number of previous encryption keys and a current encryption key.

21. An information distributing apparatus according to claim 12, wherein when the first information providing resource is an external first server and the second information providing resource is a second server,
   the first server distributes the first information via the communication path to a client as the information user unit and
   the second server distributes, if the determining step allows the second request, the second information quoted in the first information to the client.

22. An information distributing apparatus according to claim 21, wherein the second server conducts the transmission of the program code and the determining step of allowance of the second request by a Web server program.

23. An information distributing apparatus in accordance with claim 12, including a common server having the first information providing resource and the second information providing resource.

24. An information receiving method for an information user unit to receive information via a communication path from an information providing unit, comprising the steps of:

receiving and displaying first information from a first information providing resource;

issuing a request to a second information providing resource for a program code;

receiving a program code from the second information providing resource;

generating, according to the program code, a second request to receive, from the second information providing resource, second information quoted in the first information;

transmitting the second request to the second information providing resource; and receiving from the second information providing resource the second information for which quotation is allowed by the second information providing resource according to identifying information (URI) at least included in the second request, said identifying information (URI) identifying said first information, and displaying said second information as being linked to said first information.

25. An information receiving method in accordance with claim 24, wherein the program code has a password used by the second information providing resource to determine whether or not transmission of the second information quoted is allowed and the second request includes an identifier code to identify the second information to be quoted and the password.

26. An information receiving method according to claim 24, wherein the program code has an encryption key to encrypt the second request and the second request includes information obtained by encrypting an identifier code to identify the second information according to the encryption key.

27. An information receiving method according to claim 24, wherein when the first information providing resource is a first server and the second information providing resource is a second server, a client as the information user unit receives the first information via the communication path from the first server and receives from the second server the second information quoted in the first information and allowed for transmission.

28. An information receiving method according to claim 24, wherein when the first information providing resource and the second information providing resource are implemented by a common server, a client as the information user unit receives the first information via the communication path from said common server and receives from said server the second information quoted in the first information and allowed for transmission.

29. An information user unit for receiving information via a communication path from an information providing unit, comprising:

means for receiving and displaying first information from a first information providing resource;

means for issuing a request to a second information providing resource for a program code;

means for receiving a program code from the second information providing resource;

means for generating, according to the program code, a second request to receive, from the second information providing resource, second information quoted in the first information and for transmitting the second request to the second information providing resource; and means for receiving, from the second information providing resource, the second information for which quotation is allowed by the second information providing resource according to identifying information (URI) at least included in the second request, said identifying information (URI) identifying said first information, and displaying said second information as being linked to said first information.

30. An information user unit according to claim 29, further including means for displaying or outputting the first information and the second information simultaneously.

31. An information distribution method of distributing information from an information providing unit via a communication path to an information user unit, comprising the steps of:

transmitting first information from a first information providing resource to an information user unit for display at said information user unit;

issuing a first request from the information user unit which has received the first information to a second information providing resource;

transmitting a predetermined program code from the second information providing resource to the information user unit according to the first request;

generating, according to the program code, a second request by the information user unit, said second request requesting a second information providing resource to transmit second information quoted in the first information;

transmitting the second request to the second information providing resource;

determining in response to the second request whether or not the second request is allowed according to at least identifying information (URI) included in the second request, said identifying information (URI) identifying said first information; and transmitting the second information allowed from the second information providing resource to the information user unit for display at the information user unit as being linked to the first information.

32. A computer program product comprising a computer usable medium having computer readable program code means embodied therein for distributing information via a communication path to an information user unit, the computer readable program code means, comprising:

means for receiving a first request from the information user unit which has received and displayed first information from a first information providing resource;

means for transmitting a predetermined program code to the information user unit according to the first request;

means for receiving a second request from said information user unit, said second request requesting a second information providing resource to transmit second information quoted in the first information according to the program code quoted in the first information; and means for determining in response to the second request whether or not the second request is allowed according to at least identifying information included in the second request, said identifying information (URI) identifying said first information, wherein if the second request is allowed, said second information is displayed as being linked to said first information.

33. A computer program product according to claim 32, wherein the determining means:
- acquires from the second request an identifier code (ID) specifying second information for which quotation is allowed in the second information resource;
- conducts retrieval through a database including a correspondence between an identifier code (ID) specifying second information for which quotation is allowed in the second information providing resource and an identifier of first information in the first information providing source; and
- allowing the second request when an identifier of the first information corresponds to an identifier code specified by the second request in the database.

34. A computer program product according to claim 33, wherein:
- the predetermined program code has a password;
- the second request includes an identifier code to identify the second information to be quoted and the password; and
- the determining means further includes means for collating the password in the second request received from the information user unit with a valid password.

35. A computer program product according to claim 34, wherein the determining means allows the second request when the password in the second request is a valid password and the identifier code to identify the second information is included in the database.

36. A computer program product according to claim 35, further including means for frequently changing a password in a program code to be sent to the information user unit.

37. A computer program product according to claim 33, wherein:
- the program code includes an encryption key to encrypt the second request;
- the second request includes information obtained by encrypting an identifier code to identify the second information according to the encryption key; and
- the determining means further includes means for verifying to determine whether or not the second request can be decoded.

38. A computer program product according to claim 37, wherein the determining means allows the second request when the second request can be decoded and the identifier code to identify the second information is included in the database.

39. A computer program product according to claim 38, further including means for frequently changing an encryption key in a program code to be sent to the information user unit.

* * * * *